United States Patent [19]
Gautier et al.

[11] Patent Number: 5,657,680
[45] Date of Patent: Aug. 19, 1997

[54] PNEUMATIC BRAKE BOOSTER WITH FLEXIBLE VALVE

[75] Inventors: Jean Pierre Gautier; Ulysse Verbo, both of Aulnay-Sous-Bois, France

[73] Assignee: AlliedSignal Europe Services Techniques, Drancy, France

[21] Appl. No.: 581,559
[22] PCT Filed: Dec. 13, 1995
[86] PCT No.: PCT/FR95/01663
§ 371 Date: Jan. 16, 1996
§ 102(e) Date: Jan. 16, 1996
[87] PCT Pub. No.: WO96/22210
PCT Pub. Date: Jul. 25, 1996

[30] Foreign Application Priority Data
Jan. 18, 1995 [FR] France .................. 95 004488
[51] Int. Cl.⁶ .................................................. F15B 9/10
[52] U.S. Cl. .............................. 91/376 R; 91/369.1
[58] Field of Search ........................ 91/369.1, 369.2, 91/369.3, 376 R

[56] References Cited
U.S. PATENT DOCUMENTS
4,005,638  2/1977  Takeuchi ................ 91/376 R X
4,399,736  8/1983  Schubert ...................... 91/469
5,564,325  10/1996 Satoh ..................... 91/376 R X FOREIGN PATENT DOCUMENTS
2648772  6/1990  France .
2706543  12/1994 France .

*Primary Examiner*—Hoang Nguyen
*Attorney, Agent, or Firm*—Leo H. McCormick, Jr.

[57] ABSTRACT

A pneumatic brake booster having a casing (10) with an axis of symmetry (X–X') divided in a leaktight fashion by a moving wall structure (12) into a front chamber (14) and a rear chamber (12). The front chamber (14) is permanently connected to a source of low pressure and the rear chamber (12) is connected selectively to the front chamber (14) or to a source of high pressure by a three-way valve (36). The three-way valve (36) is actuated by a control rod (30) capable of bearing via a front face of a plunger (28) on a rear face of a push rod (48) secured to a reaction disk (49). The plunger (28) slides in a bore (26) of the moving wall structure (12) in response to an input force applied by an operator. The three-way valve (36) includes a valve element (36) located in a tubular rear part (22) of the moving wall structure (12) and interacts via with a first annular region (40l) of an annular front face (40) with a first annular valve seat (28a) formed on the plunger (28) and via a second annular region (40e) of the annular front face (40) with a second annular valve seat (20a) formed on the moving wall structure (12). The first valve seat (28a) is concentric with the second valve seat (20a) and of a smaller diameter. The annular front face (40) of the valve element is urged toward the annular valve seats (20a, 28a) by a valve spring (42) and is reinforced by a rigid annular insert (46,46'; 56,56'). The rigid annular insert (46,56) is situated axially behind just one (40e) of the regions (40e, 40i) via which the annular front face (40) of the valve element (36) interacts with one (20a) of the annular valve (20a, 28a).

3 Claims, 2 Drawing Sheets

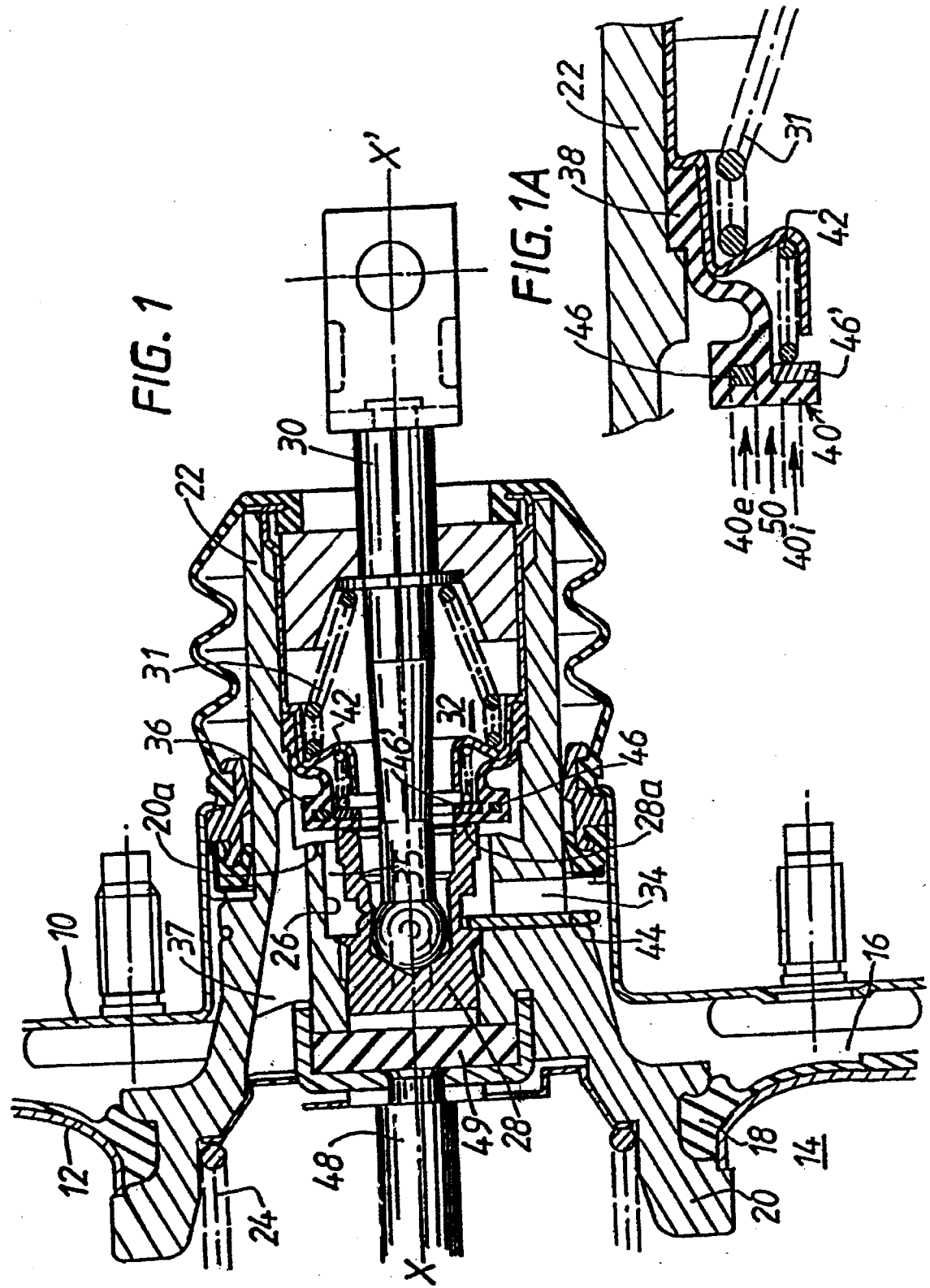

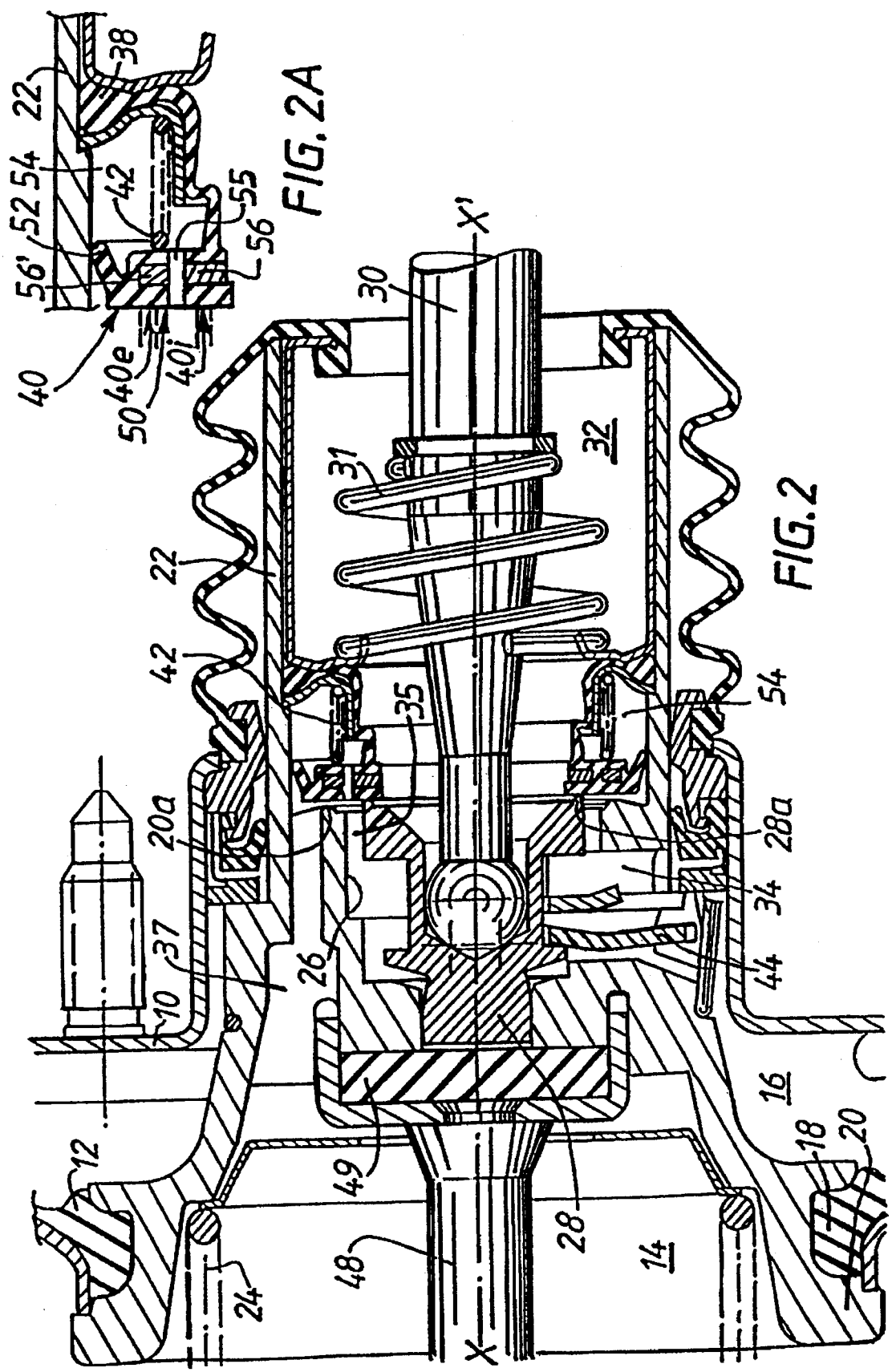

PNEUMATIC BRAKE BOOSTER WITH FLEXIBLE VALVE

The present invention relates to pneumatic boosters of the type used to boost the braking of motor vehicles.

Such boosters are well known in motor car technology and conventionally include a casing having an axis of symmetry, the casing being divided in leaktight fashion by a moving wall structure into a front chamber permanently connected to a source of low pressure, and a rear chamber connected selectively to the front chamber or to a source of high pressure by a three-way valve means actuated by a control rod capable of bearing, via the front face of a plunger, on the rear face of a push rod secured to a reaction disk, the plunger sliding in a bore of the moving wall, the three-way valve including a valve element located in a tubular rear part of the moving wall and interacting via a first region of an annular front face with a first annular valve seat formed on the plunger and, via a second region of the annular front face, with a second annular valve seat formed on the moving wall, the first valve seat being concentric with the second valve seat and of smaller diameter, the annular front face of the valve element being urged toward the annular valve seats by a valve spring and being reinforced by a rigid annular insert.

Furthermore, the control rod is returned to its rear position of rest by a rod spring, bearing on a spring plate secured to the rear tubular part, this position of rest being defined by a limit stop member secured to the moving wall, against which one shoulder of the plunger bears.

The mass-production of these boosters requires manufacturing tolerances to be envisaged, particularly for the bore in the moving wall in which the plunger slides and for the plunger itself, so that it can slide freely in this bore, as well as for the valve spring and for the limit stop member.

As a result of the combination of these factors, the plunger does not slide in the bore of the moving wall while remaining perfectly parallel to itself. The axes of the bore and of the plunger may thus form an angle which may reach 1 to 2 degrees, depending on the friction and rotational torques to which the plunger and control rod are subjected. Correspondingly, the planes in which the first and second annular valve seats are formed may form an angle of the same value between them as the plunger moves.

It follows that the sealing between the annular front face of the valve element and at least one of the annular valve seats is not accomplished under the best of conditions. When the booster is operating, for a given force on the control rod theoretically resulting in a position of equilibrium, it may happen that, depending on the respective configurations of the valve seats, the booster exhibits a leak between the source of high pressure and the front chamber or the rear chamber of the booster, and that the output force of the booster therefore does not correspond to that which is expected as a function of the input force.

A known solution for solving this problem consists in increasing the preload at rest and/or the stiffness of the valve spring. This solution does, however, exhibit the drawback of substantially increasing the hysteresis of the booster.

Another solution known, for example, from the document FR-A-2,560,135 consists in providing the annular front face of the valve element with concentric projections, each of which is in the form of a torus cut through transversely relative to its axis of rotation, the respective axes of rotation coinciding with the longitudinal axis of the valve element. Such a solution exhibits various drawbacks: the dead travel of the booster is increased substantially, the booster jump, which constitutes one of the more important parameters in the operation of boosters, can no longer be controlled satisfactorily, and the parasitic friction induced by the particular shape of the front face of the valve element also contribute to increasing the hysteresis of the booster.

Document U.S. Pat. No. A-4,399,736, which corresponds to the preamble of the main claim, also makes known a solution to this problem, according to which solution a valve element is reinforced by a rigid annular insert arranged axially behind the first annular valve seat formed on the plunger. The outer part of the valve element arranged behind the annular valve seat and formed on the moving wall has no insert. A furrow or groove is formed on the valve element in front of or behind the front face of the latter, in its part situated between the two annular valve seats, to give the external part of the valve element a certain degree of flexibility.

This solution too suffers from the drawback of exhibiting substantial dead travel. Indeed, given the great elasticity of the outer part of the front face of the valve element, this also results in a substantial deformation of this front face, and it is practically impossible to get one of the valve passages to open immediately after the other valve passage has closed.

The present invention falls within this context and its object is to provide a booster in which the sealing between the annular front face of the valve element and each valve seat is achieved regardless of the manufacturing tolerances on the various components of the booster and regardless of the angular position of the plunger in the bore permitted by these tolerances, this improved sealing being obtained without moreover impairing the other performance aspects or features of the booster.

SUMMARY OF THE INVENTION

To this end, the present invention makes provision for the annular front face of the valve element to be reinforced by a second rigid annular insert situated axially behind the second annular region of the annular front face of the valve element interacting with the second annular valve seat, and for to include an elastically deformable intermediate annular region situated between the first and second annular regions via which the annular front face of the valve element interacts with the annular valve seats.

In that way, each annular region of the annular front face of the valve element can achieve sealing with the corresponding annular valve seat regardless of the angle between the planes containing these annular seats, by virtue of the elasticity of this deformable intermediate region.

Other objects, features and advantages of the present invention will emerge more clearly from the description which follows of one embodiment given by way of illustration with reference to the appended drawing.

BRIEF DESCRIPTION OF THE DRAWINGS

FIG. 1 represents a side view, in longitudinal section, of the rear central part of a pneumatic brake booster produced in accordance with the present invention;

FIG. 1A represents an enlarged half-view of the valve element of FIG. 1;

FIG. 2 represents a side view, in longitudinal section, of the rear central part of a pneumatic brake booster produced in accordance with a second embodiment of the present invention, and FIG. 2A represents an enlarged half-view of the valve element of FIG. 2.

DETAILED DESCRIPTION OF THE DRAWINGS

FIG. 1 represents a sectional view of the rear central part of a pneumatic brake booster designed to be placed, in a conventional way, between the brake pedal of a vehicle and the master cylinder controlling the pressure in the hydraulic braking circuit of this vehicle.

By convention, that part of the booster turned towards the master cylinder is called the "front", and that part of the booster turned towards the brake pedal is called the "rear". In the figures, the front is thus to the left and the rear to the right.

The booster represented in FIGS. 1 and 2 comprises an outer casing 10 in the form of a shell, exhibiting a symmetry of revolution about an axis X-X'. Only the rear central part of this casing 10 is represented in FIGS. 1 and 2.

A moving wall structure 12 delimits a front chamber 14 and a rear chamber 16 inside the casing 10. The moving wall 12 is associated with a flexible unrolling diaphragm made of elastomer, the, internal peripheral edge of which is accommodated in leaktight fashion by virtue of a bead 18 in a hollow boost piston 20 located along the axis X-X' of the booster, and the outer peripheral edge (not represented) of which is fastened in leaktight fashion onto the outer casing 10.

The hollow piston 20 extends to the rear in the form of a tubular part 22 which passes in leaktight fashion through the rear wall of the casing 10. A compression spring 24 interposed between the piston 20 and the front wall (not represented) of the casing 10 normally holds the piston 20 in the rear position of rest illustrated in the figures, in which position the rear chamber 16 exhibits its minimum volume and the front chamber 14 its maximum volume.

In the central part of the moving wall situated in front of the rear tubular part 22, the piston 20 has a bore 26 in which a plunger 28 is slidably mounted. The front end of a rod 30 for controlling the booster, this rod also being located along the axis X-X', is mounted so that it can swivel in a blind bore of the plunger 28.

The rear end of the control rod 30, which projects outside the tubular part 22, is operated directly by the brake pedal (not represented) of the vehicle and is returned to its position of rest by a return spring 31.

The annular space 32 around the control rod 30 can communicate with the rear chamber 16 through a radial passage 34 formed in the central part of the piston 20 when the boost means controlled by the plunger 28 are actuated.

In a way known, for example, from the above-mentioned documents, these boost means comprise a three-way valve including an annular valve 36 and two concentric annular valve seats 20a and 28a formed respectively at the rear of the central part of the piston 20 and at the rear of the plunger 28, the seat 28a having a smaller diameter than that of the seat 20a, a space 35 being formed between these two seats and communicating with the radial passage 34.

The valve 36 constitutes the smaller-diameter front end of a flexible tubular sleeve made of elastomer, the rear end 38 of which (FIG. 1A) is fastened in leaktight fashion into the tubular part 22, and it has an annular front face 40 which can move along the axis X-X', this front face being urged forward by a valve spring 42 so as to cause an outer annular region 40e to interact with the valve seat 20a and, separately or in combination, to cause an inner annular region 40i to interact with the valve seat 28a.

In a conventional manner, depending on the position of the plunger 28 inside the bore 26, one of the valve passages 20a-40e or 28a-40i is open either to cause the annular space 32 to communicate with the radial passage 34 during braking action or to cause the space 35 to communicate with a substantially axial passage 37 formed in the central part of the piston 20 and emerging into the front chamber 14 as the booster returns to the position of rest.

Finally, at least one limit stop member 44 mounted in the central part of the piston 20 delimits the axial travel of the plunger 28 inside the bore 26. The plunger 28 is normally held in its rear position of rest defined by the member 44 by means of the return spring 31.

It can therefore be understood that, as was explained above, under the effect of the various rotational torques and friction to which the various moving parts of which the booster is composed may be subjected, the plunger 28 may adopt any position whatever in the bore 26 as permitted by the manufacturing tolerances on these elements.

For example, at rest, the plunger 28 is in abutment on the member 44 and the control rod 30 is subjected to the action of the spring 31 so that the plunger 28 is subjected to a torque and tends to skew in the bore 26. In FIG. 1, it thus tends to turn in the clockwise direction.

Likewise, during operation, since the force transmitted by the control rod 30 is not directed along the axis X-X'owing to the fact that the brake pedal is mounted like a lever, the axis of symmetry of the plunger will not necessarily coincide with the axis X-X'of the booster.

The result is then that the valve seats 20a and 28a therefore fall within planes which form a certain angle between them, and that the sealing between the annular front face 40 and the valve seats 20a and 28a can be guaranteed only by giving the valve spring 42 a relatively high preload at rest and/or a relatively high stiffness.

In accordance with the present invention, and as represented in the figures, this drawback is avoided by making provision for equipping the valve with an elastically deformable intermediate annular region 50 situated between the first 40i and second 40e annular regions via which the annular front face 40 of the valve element 36 interacts with the annular valve seats.

According to the embodiment of FIGS. 1 and 1A, the invention makes provision for equipping the valve 36 with a rigid annular insert 46 in order to reinforce the annular front face 40, behind the annular region 40e interacting with the valve seat 20a, and with a second rigid annular insert 46' situated axially behind the other annular region 40i interacting with the valve seat 28a.

The two inserts 46 and 46' are of course concentric and form between them the deformable intermediate annular region 50, situated approximately behind the space 35 between the two valve seats 20a and 28a, and which gives the annular front face 40 the desired elasticity.

Thus, assuming that the plunger 28, at rest, is askew in the bore 26, the annular region 40i will naturally be applied, by virtue of the elasticity of the intermediate region 50, to bear in sealed fashion on the valve seat 28a, regardless of the angle that the plane containing the seat 28a forms with the axis X-X', and without there being any need to exert a high stress via the spring 42.

During a braking action, the driver of the vehicle depresses the brake pedal in order to move the control rod 30 forward. The plunger 28 slides in the bore 26, adopting any angular position whatever in this bore. In these conditions of operation, the axial distance between the valve seat 20a and the annular region 40e decreases, and if the axis of the plunger is not collinear with or parallel to the axis X–X' of the booster, then an angular portion of the region 40e first of all comes into abutment on the value seat 20a whilst the diametrically opposite angular portion of the region 40e has not yet made contact with the valve seat 20a.

With the plunger 28 continuing to move forward in the bore 26, the entire region 40e then comes into sealed contact with the valve seat 20a, even if the latter is not situated in a plane parallel to that of the valve seat 28a, by virtue of the elasticity of the valve 36, and in particular of the annular region 50, whilst the annular region 40i remains applied in leak-tight fashion to the valve seat 28a. Such elasticity, or more precisely deformability of the front face 40 is permitted by the fact that the inserts 46 and 46' reinforce and the annular front face 40 only in its annular regions 40e and 40i, the annular region 50 being progressively deformed.

At this stage of operation, the front and rear chambers of the booster are isolated from one another. When the forward movement of the plunger opens the valve passage 28a–40i, it allows communication between the rear chamber 16 and the annular space 32 via the space 35 and the passage 34.

The pressure can thus increase in the rear chamber 16 of the booster and create a pressure difference across the moving wall 12, generating a boost force which tends to displace it forward, this force being force being transmitted to a push rod 48 via an annular front face of the piston 20 acting on a reaction disk 49 on the central part of which the front face of the plunger 28 bears.

It can therefore be seen that the specific construction according to the present invention of the valve 36, of its inserts 46 and 46' and of its deformable intermediate region 50 thus allows the annular front face 40 of the valve 36 constantly to bear in sealed fashion on at least one of the valve seats 20a and/or 28a regardless of the respective angular position of the plunger 28 in the bore 26.

The so-called position of equilibrium of the booster, in which the valve seats 20a and 28a interact alternately or simultaneously with the annular regions 40e and 40i respectively is thus achieved under the best possible conditions, despite the imperfections which are inherent to the construction of the booster. An output force is therefore indeed obtained from the booster which is in accordance with that desired by the application of a given-input force.

FIGS. 2 and 2A represent a second embodiment of the present invention, applicable to a valve of the type described, for example, in document WO 94/04403.

According to this embodiment, the annular front face 40 is connected to the rear part 38 via its internal peripheral edge, and it slides in leaktight fashion inside the tubular part 22 via its outer peripheral edge 52, forming, a lip-type seal, so that it defines a chamber 54 with the rear part 38.

The annular front face further includes openings 55 causing this chamber 54 to communicate with the space 35 situated between the valve seats 20a and 28a. As in the previous embodiment, the valve 36 is equipped with rigid annular inserts 56 and 56' for reinforcing the annular front face 40, the rigid annular insert 56 being situated axially behind the only annular region 40i to interact with the valve seat 28a, and the second rigid annular insert 56' situated axially behind the other annular region 40e interacting with the valve seat 20a.

As in the embodiment of FIGS. 1 and 1A, the two inserts 56 and 56' are concentric and form between them the deformable intermediate annular region 50 situated approximately behind the space 35 between the two valve seats 20a and 28a, and which gives the annular front face 40 an elasticity similar to that of the valve of FIGS. 1 and 1A, thus allowing the regions 40e and 40i to achieve sealed contact with the valve seats 20a and 28a, even if these seats are not situated in parallel planes, by forming a deformable intermediate region 50. Advantageously, the openings 55 will be made in the annular front face 40 in the intermediate region 50 between the two inserts 56 and 56' so as to make the valve element 36 easier to manufacture, the other annular region 40i not being reinforced by any insert, and being urged forward by the valve spring 42.

Thus, as in the previous embodiment, assuming that the plunger 28 is askew in the bore 26, the annular region 40i is applied, by virtue of the elasticity of the intermediate annular region 50 in sealed contact onto the valve seat 28a, regardless of the angle that the plane containing the seat 28a forms with the axis X–X', and without there being any need to exert a high stress via the spring 42.

As seen above, during a braking action, the plunger 28 moves forward sliding in the bore 26, and starting from any angular position whatever in this bore. During this movement, the axial distance between the valve seat 20a and the annular region 40e decreases, and if the axis of the plunger is not collinear with or parallel to the axis X–X' of the booster then an angular portion of the region 40e first of all comes into abutment on the valve seat 20a while the diametrically opposite angular portion of the region 40e has not yet come into contact with the valve seat 20a.

With the plunger 28 continuing to move forward in the bore 26, the whole annular region 40e then comes into sealed contact with the valve seat 20a, even if the latter is not situated in a plane parallel to that of the valve seat 28a, by virtue of the elasticity of the valve 36 permitted by the fact that the inserts 56 and 56' reinforce the annular front face 40 only in the annular regions 40i and 40e and by the fact that the intermediate annular region 50 deforms progressively.

It can thus be seen that, in this embodiment also, the particular construction according to the present invention of the valve 36, of its inserts 56 and 56' and of its deformable intermediate region 50 thus allows the front annular face 40 of the valve 36 constantly to be in sealed contact with at least one of the valve seats 20a and/or 28a, regardless of the respective angular position of the plunger 28 in the bore 26.

Of course, the invention is not limited to the embodiments which have been described but can, in contrast, receive many modifications which will be obvious to the expert. Thus, for example, the invention is applicable in the same way to boosters of the tandem type or boosters with additional chambers.

We claim:

1. A pneumatic brake booster including a casing having an axis of symmetry, said casing being divided in leaktight fashion by a moving wall structure into a front chamber permanently connected to a source of low pressure, and a rear chamber connected selectively to said front chamber or to a source of high pressure by a three-way valve means actuated by a control rod capable of bearing, via a front face of a plunger, on a rear face of a push rod secured to a reaction disk, said plunger sliding in a bore of said moving wall, said three-way valve including a valve element located in a tubular rear part of said moving wall and interacting via a first annular region of an annular front face with a first annular valve seat formed on said plunger and, via a second annular region of said annular front face, with a second annular valve seat formed on said moving wall, said first valve seat being concentric with the second valve seat and of smaller diameter, said annular front face of the valve element being urged toward said annular valve seats by a valve spring and being reinforced by a rigid annular insert situated axially behind said first annular region via which regions said annular front face of the valve element interacts with said first annular valve seat, characterized in that said annular front face of said valve element is reinforced by a second rigid annular insert situated axially behind said second annular region of said annular front face of said valve element interacting with said second annular valve seat and includes an elastically deformable intermediate annular region situated between said first and second annular regions via which said annular front face of said valve element interacts with said annular valve seats.

2. The pneumatic booster according to claim 1, characterized in that said annular front face of said valve further includes at least one opening causing a chamber situated behind said annular front face of said valve to communicate with a space situated between said first and second valve seats.

3. The pneumatic booster according to claim 2, characterized in that said openings are made in said annular front face in a deformable intermediate region between said two rigid annular inserts.

* * * * *